United States Patent [19]

Sakai et al.

[11] Patent Number: 4,568,963
[45] Date of Patent: Feb. 4, 1986

[54] SIGNAL CONVERTER CIRCUIT FOR COLOR TV

[75] Inventors: Tetsuro Sakai; Kazuhiko Honda, both of Fukaya, Japan

[73] Assignee: Tokyo Shibaura Denki Kabushiki Kaisha, Kawasaki, Japan

[21] Appl. No.: 476,401

[22] Filed: Mar. 17, 1983

[30] Foreign Application Priority Data

Mar. 19, 1982 [JP] Japan .............................. 57-462694

[51] Int. Cl.$^3$ .............................................. H04N 9/42
[52] U.S. Cl. ...................................................... 358/11
[58] Field of Search .......................................... 358/11

[56] References Cited

U.S. PATENT DOCUMENTS 4,314,273 2/1982 Amery .................................. 358/11

FOREIGN PATENT DOCUMENTS

| 2340745 | 1/1975 | Fed. Rep. of Germany . |
| 2652905 | 7/1978 | Fed. Rep. of Germany . |
| 1295272 | 11/1972 | United Kingdom . |
| 1407039 | 9/1975 | United Kingdom . |
| 1497865 | 1/1978 | United Kingdom . |

*Primary Examiner*—Richard Murray
*Attorney, Agent, or Firm*—Cushman, Darby & Cushman

[57] ABSTRACT

A signal converter for a color TV is used for converting a signal of the NTSC system, in which a subcarrier is quadrature-modulated by two chroma signal components, to a signal of the PAL system, in which a subcarrier is quadrature-modulated by two chroma signal components one of which two chroma signal components is inverted for each successive line, or vice versa. The signal converter includes a signal input terminal which receives an original signal having chroma signal components which are quadrature-modulated on a subcarrier having a frequency f1, a signal output terminal for producing a converted signal having chroma signal components which are quadrature-modulated on a subcarrier having a frequency f2 (where f1≠f2), a first signal generator for generating a first continuous wave signal having a frequency equal to a difference between the frequencies f1 and f2, a second signal generator for generating a second continuous wave signal having a frequency equal to a sum of the frequencies f1 and f2, a modulator for producing a first modulated signal by multiplying a signal corresponding to the original signal received by the signal input terminal by the first continuous wave signal and for producing a second modulated signal by multiplying the signal corresponding to said original signal by the second continuous wave signal, a line changeover switch for alternately switching between the first and second modulated signals from the modulator for each successive line, and for supplying a selected signal to a signal transmission line coupled to the signal output terminal, and a filter interposed between the signal output terminal and the modulator, for extracting the chroma signal components to be produced from the signal output terminal from the first and second modulated signals.

10 Claims, 16 Drawing Figures

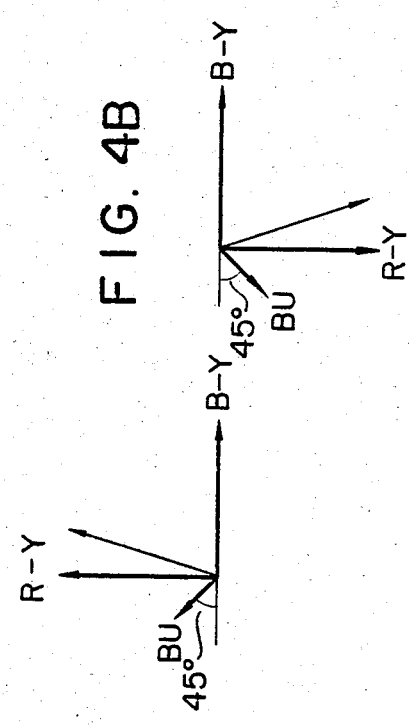

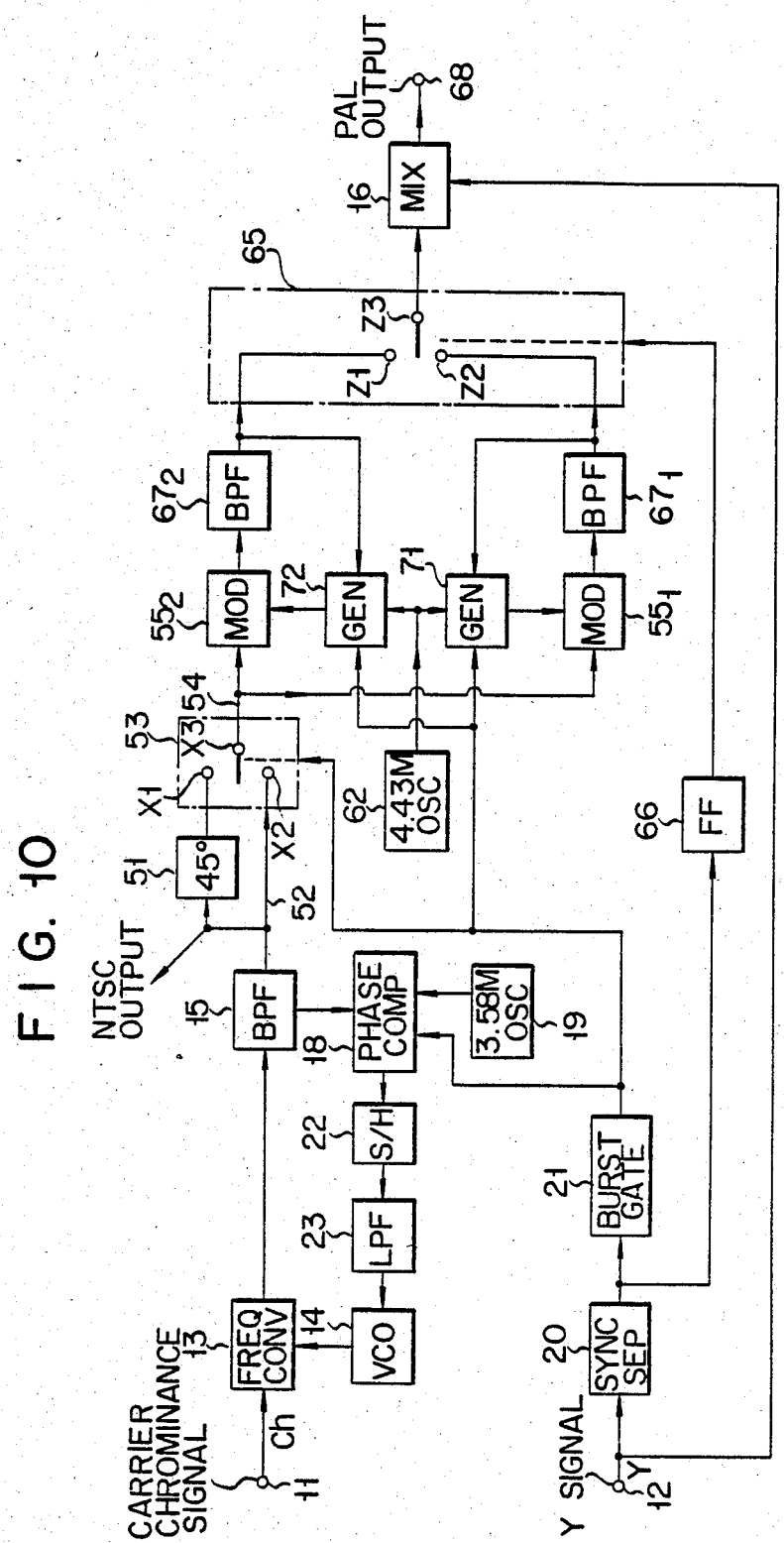
F I G. 10

– 4,568,963 –

SIGNAL CONVERTER CIRCUIT FOR COLOR TV

BACKGROUND OF THE INVENTION

The present invention relates to a signal converter circuit for a color TV. More particularly, the present invention relates to a signal converter circuit for converting a color TV signal of the NTSC system which has a carrier chrominance signal obtained from quadrature modulation of the subcarrier by two chroma signal components into a color TV signal of the PAL system which is obtained from quadrature modulation by phase alternation by lines, or vice versa. In a video disc reproduction system or the like for recording NTSC-system carrier chrominance signals by low-frequency conversion and for reproducing them, the signal converter circuit of the present invention may be suitably adapted for reproducing the signals with a PAL-system TV receiver.

In general, an NTSC color TV signal includes a carrier chrominance signal obtained by quadrature modulation of the subcarrier by two chroma signal components, in addition to the luminance signal. When such a color TV signal is to be recorded on a recording medium such as a video disc, the carrier chrominance signal is low-frequency converted, and the obtained low-frequency signal is recorded. In order to reproduce the signal from the video disc, frequency conversion of the signal to the original frequency carrier chrominance signal is performed.

The reproduction system of a video disc on which signals are recorded by the NTSC system will briefly be described with reference to FIG. 1.

A color TV signal to be reproduced and detected from a video disc is separated by a filter into a carrier chrominance signal Ch and a luminance signal (Y signal) including a sync signal, which are respectively supplied to input terminals 11 and 12. The carrier frequency of the carrier chrominance signal Ch supplied to the input terminal 11 is frequency-interleaved with the Y signal supplied to the input terminal 12:

$$195/2 \cdot fH = 1.534091 \text{ (Mhz)}$$

where fH is the line frequency. In order to reconvert the carrier chrominance signal of 1.53 MHz into an original carrier chrominance signal of 3.58 MHz, the carrier chrominance signal of 1.53 MHz is supplied to a frequency converter 13 which multiplies the input signal by a CW (carrier wave) signal of 5.11 MHz (1.53+3.58). The CW signal is supplied from a 5.11 MHz VCO (voltage-controlled oscillator) 14. The multiplication product from the frequency converter 13 is supplied to a band-pass filter 15 of 3.58 MHz band-pass characteristic which produces an NTSC chrominance signal of 3.58 MHz. This chrominance signal from the frequency converter 13 and the Y signal supplied to the input terminal 12 are supplied to a mixer 16 which produces an NTSC color TV signal to an output terminal 17.

A video disc player is subject to time base error of signal components which is caused by wow and flutter of a turntable or the like. Such time base error causes significant jitter in the carrier wave of 1.53 MHz frequency. A video disc player generally has an automatic phase control (APC) loop in order to eliminate such jitter. More specifically, the chrominance signal reconverted to a frequency of 3.58 MHz is supplied to a phase comparator 18 which compares the phase of this input signal with that of a reference signal having a frequency of 3.58 MHz during one burst period. The reference signal of 3.58 MHz is supplied from a 3.58 MHz oscillator 19. A burst gate pulse is obtained from a burst gate pulse generator 21, which receives an output signal from a sync separator 20 which separates a sync signal from the Y signal supplied to the input terminal 12, and which then supplies an output signal to the phase comparator 18. An output signal from the phase comparator 18 is held for a 1-H period by a sample and hold circuit 22, and is supplied to an oscillation frequency control end of the 5.11 MHz VCO 14 through a low-pass filter 23.

A PAL color TV system has, in addition to the luminance signal, two chroma signal components according to which the subcarrier is quadrature-modulated. One (R-Y signal) of the two chroma signal components is inverted for each successive line. A carrier frequency fsc of the PAL system is generally selected to be 4.43 MHz.

FIG. 2 shows an example of a demodulation circuit for demodulating such a PAL color TV signal. Referring to FIG. 2, a PAL composite signal is supplied to an input terminal 25 and is then supplied to a C-Y separator 26 which produces a Y signal onto a line 27 and a carrier chrominance signal onto a line 28. The carrier chrominance signal is subjected to an addition by an adder 30 and a subtraction by a subtractor 31 of a delayed carrier chrominance signal from a 1-line delay line 29. A B-Y signal appears at the output end of the adder 30, while an R-Y signal appears at the output end of the subtractor 31. These B-Y and R-Y signals are respectively supplied to B-Y and R-Y demodulators 32 and 33. The line 28 is also connected to a local subcarrier oscillator 35 through a burst phase discriminator 34. A reference subcarrier signal of 4.43 MHz is supplied to the B-Y demodulator 32 through a 90° phase shifter 36 and is also supplied to the R-Y demodulator 33 through a line changeover switch 37. Since the R-Y signal changes its polarity or phase for each successive line, the reference subcarrier signal to be supplied to the R-Y demodulator 33 must be inverted by 180° for each successive line. Thus, the line changeover switch 37 has a 180° phase shifter 371 and a changeover switch 372. The changeover switch 372 is switched between a 180° phase shift line 381 and a direct coupling line 382 for each line.

In order to control the switching operation of the changeover switch 372, an output signal from a flip-flop 40 is supplied to the changeover switch 372 as a line changeover switch. The output signal from the flip-flop 40 may be obtained by separating with a sync separator 39 a sync signal from the PAL composite signal supplied to the input terminal 25 and supplying the sync signal to the flip-flop 40.

The signals sync-detected by the B-Y and R-Y demodulators 32 and 33 are supplied to a matrix circuit 41 which produces blue, green and red signals B, G and R, respectively.

When a TV receiver of the PAL system receives an NTSC signal, the luminance signal may be reproduced, albeit with some unnaturalness due to slight differences in the standards; for example, the vertical amplitude is shortened since the NTSC system uses 525 scanning lines while the European PAL system uses 625 scanning lines. However, the chrominance or chroma signal cannot be received due to the system differences.

In European countries where the PAL system is adopted, it may be desired to receive an NTSC signal with a PAL receiver or to receive a PAL signal with an NTSC receiver. In order to respond to such needs, there has been proposed a method involving satellite communication. In accordance with this method, an NTSC color TV signal is demodulated upon reception by the satellite, is converted into a PAL-system color TV signal, and is received by a PAL-system color TV set. Conversely, a PAL color TV signal is converted into an NTSC color TV signal and is received by an NTSC-system color TV set.

However, when it is desired to reproduce signals on an NTSC-system video disc with a PAL-system color TV, the system adopting a satellite as described above may not easily be applied to equipment due to limited standards, high cost and so on.

One example of an NTSC-PAL color TV signal converter circuit is described in Japanese patent application No. 43-14286. This system uses a means for mixing two chroma signal components modulated on the subcarrier with a signal having a frequency double that of the subcarrier. This system may be suitably adapted when the NTSC and PAL systems involved use the same carrier frequency. However, in practice, the NTSC system has a carrier frequency of 3.58 MHz, while the PAL system has a carrier frequency of 4.43 MHz. This implies a need for frequency conversion.

SUMMARY OF THE INVENTION

It is an object of the present invention to provide a signal converter circuit for a color TV, which is capable of converting an NTSC color TV signal to a PAL color TV signal or vice versa.

It is another object of the present invention to provide a signal converter circuit for a color TV, which is capable of converting a color TV signal recorded in accordance with the NTSC system to a PAL color TV signal, in a system for recording a carrier chrominance signal obtained in accordance with the NTSC system on a recording medium (e.g., a video disc) by low-frequency conversion and for recording such a signal. When a signal converter of the present invention is built in a reproducing system (e.g., a video disc player), a PAL receiver can reproduce the signal.

In order to achieve the above and other objects, there is provided according to the present invention a signal converter circuit for a color TV, comprising:

a signal input terminal which receives an original signal having chroma signal components by which a subcarrier having a frequency f1 is quadrature-modulated;

a signal output terminal for producing a converted signal having chroma signal components by which a subcarrier having a frequency f2 (where f1≠f2) is quadrature-modulated;

signal generating means for generating a first continuous wave signal having a frequency equal to a difference between the frequencies f1 and f2 and for generating a second continuous wave signal having a frequency equal to a sum of the frequencies f1 and f2;

modulating means for producing a first modulated signal by multiplying the original signal received by the signal input terminal by the first continuous wave signal and for producing a second modulated signal by multiplying the original signal received by the signal input terminal by the second continuous wave signal;

a line changeover switch for alternately switching between the first and second modulated signals from the modulating means for each successive line and for supplying a selected signal to a signal transmission line coupled to the signal output terminal; and filter means, interposed between the signal output terminal and the modulating means on the signal transmission line, for extracting the chroma signal components to be produced from the signal output terminal from the first and second modulated signals.

BRIEF DESCRIPTION OF THE DRAWINGS

FIGS. 4A to 4C are vector diagrams showing color TV signals in accordance with the PAL and NTSC systems, respectively;

FIG. 10 is a block diagram showing a signal converter circuit for a color TV according to still another embodiment of the present invention.

DETAILED DESCRIPTION OF THE PREFERRED EMBODIMENTS

Figure 3:
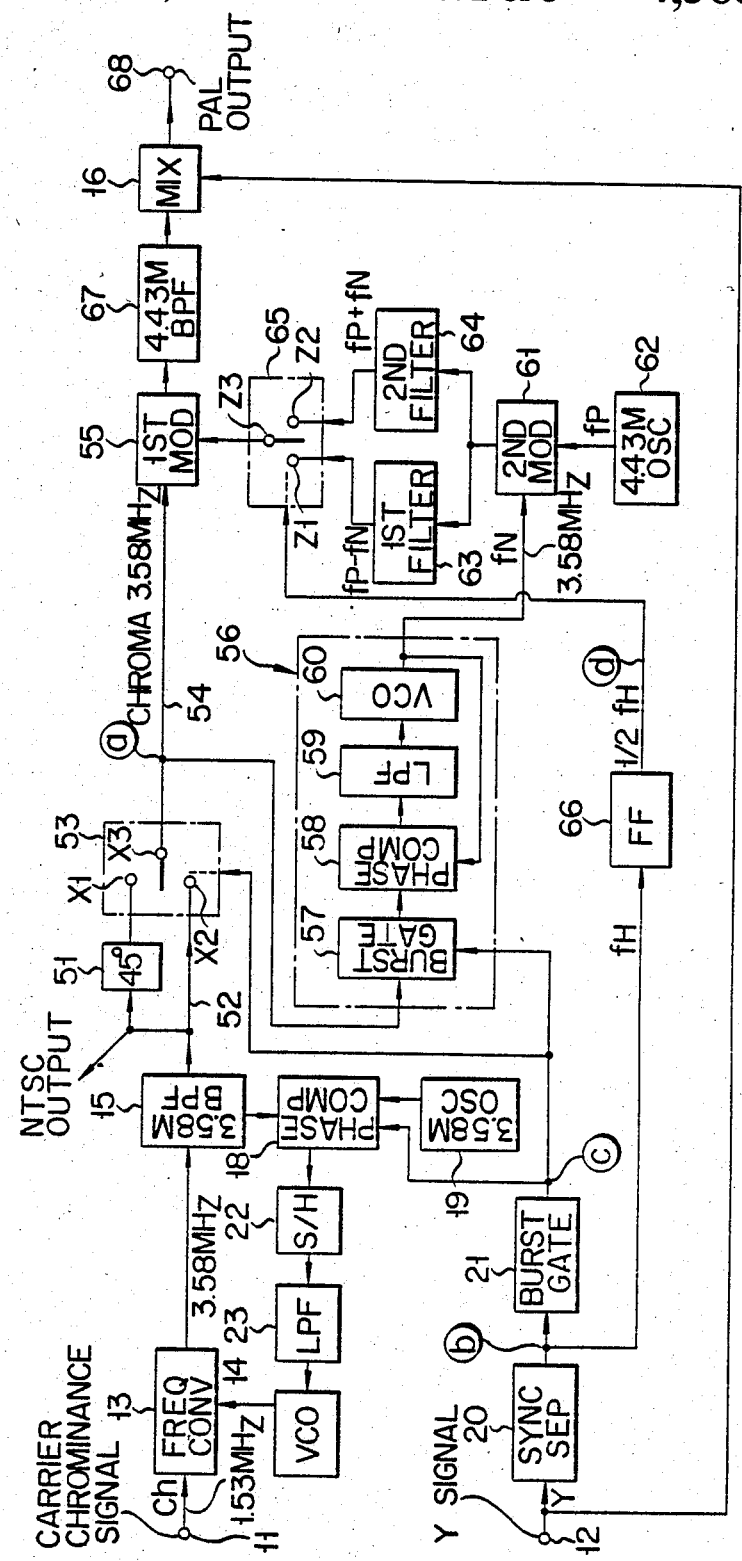
FIG. 3 is a block diagram showing a signal converter circuit for a color TV according to an embodiment of the present invention.
Figures 5A, 5B, 5C, 5D, 6:
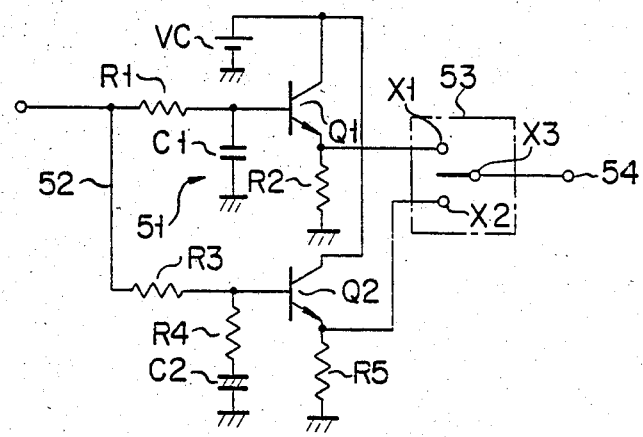
FIGS. 5A to 5D show waveforms at respective parts of the circuit of the present invention.
FIGS. 6 to 8 are circuit diagrams showing parts of the circuit shown in FIG. 3.

The preferred embodiment of a signal converter circuit for a color TV according to the present invention as applied to a video disc player will now be described with reference to FIGS. 3 to 8. FIG. 3 is a block diagram showing a signal converter circuit for a color TV according to an embodiment of the present invention, FIGS. 4 and 5 show the signal vectors and waveforms of the respective parts for explaining the mode of operation of the circuit shown in FIG. 3, and FIGS. 6 to 8 are circuit diagrams of parts of the circuit shown in FIG. 3.

Before describing the circuit of the present invention with reference to FIG. 3, the difference between chroma signals in accordance with the PAL and NTSC systems will first be described with reference to FIG. 4.

In accordance with the PAL system, two chroma signal components B-Y and R-Y are simultaneously transmitted, as in the case of the NTSC system. However, in the PAL system, the R-Y signal is inverted for each successive line. The subcarrier is quadrature-modulated by the R-Y and B-Y signals. Referring to FIG. 4, the signals have a phase shown in FIG. 4(a) for a given line, and have a phase shown in FIG. 4(b) for the next line wherein the R-Y axis is inverted. Note that a burst signal BU is inclined by 45° with respect to the B-Y axis.

In contrast to this, in accordance with the NTSC system, the subcarrier is quadrature-modulated by two chroma signal components B-Y and R-Y as shown in FIG. 4(c). Referring to FIG. 4(c), the signals have the same vectors for every line, and a burst signal BU is inverted (180° phase shift) with respect to the B-Y axis.

For this reason, in order to reproduce with a PAL receiver a signal recorded according to the NTSC system, the following measures must be taken. First, the carrier chrominance signal of 1.53 MHz must be reconverted to an original frequency carrier chrominance signal of 4.43 MHz. Second, the phase of the R-Y signal must be inverted for each successive line. Third, the phase of the burst signal BU must be inclined by 45° with respect to the B-Y axis.

Figure 1:
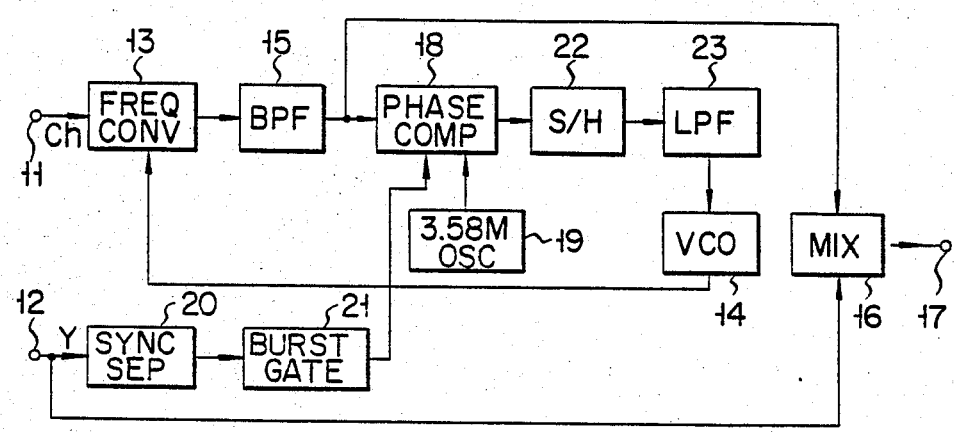
FIG. 1 is a block diagram showing a conventional signal converter circuit for an NTSC-system color TV.
Figure 2:
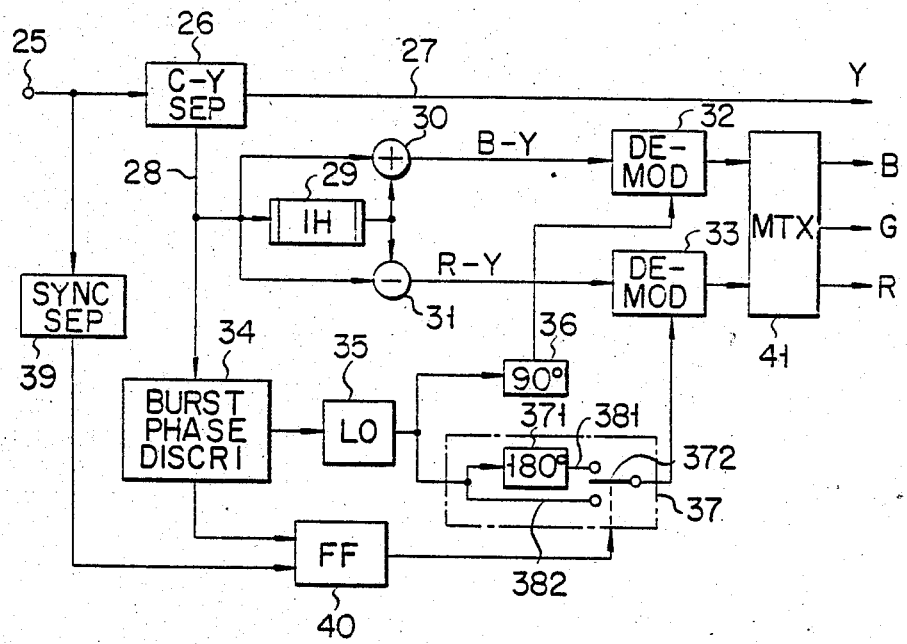
FIG. 2 is a block diagram showing a conventional PAL demodulator.

The same reference numerals as used in FIG. 3 denote the same parts as in FIG. 1. Referring to FIG. 3, a color TV signal to be reproduced from a video disc is separated by a filter into a carrier chrominance signal Ch and a luminance signal (Y signal) including a sync signal. The carrier chrominance signal Ch and the Y signal are respectively supplied to input terminals 11 and 12. The carrier frequency of the carrier chrominance signal Ch is 1.53 MHz. The carrier chrominance signal Ch is supplied to a frequency converter 13 to be converted to an original chrominance signal of 3.58 MHz frequency. A CW signal of 5.11 MHz (5.11=1.53+3.58) from a voltage-controlled oscillator (VCO) 14 is also supplied to the frequency converter 13. The frequency converter 13 produces an original chrominance signal of 3.58 MHz by multiplying the vector of the 1.53 MHz signal by that of the 5.11 MHz signal. The signal from the frequency converter 13 is supplied to a circuit of a later stage through a band-pass filter 15 of 3.58 MHz band-pass characteristic. Note that the output signal from the band-pass filter 15 may be used as an NTSC-type color chrominance carrier signal.

A video disc player of this type is subject to time base error of the signal components, which is attributable to the wow and flutter of the turntable or the like. This causes significant jitter in the carrier wave of 1.53 MHz frequency. An APC loop is incorporated so as to eliminate such jitter. An output signal from the band-pass filter 15 is supplied to a phase comparator 18 to be compared with a CW signal of 3.58 MHz for a 1-burst period. The CW signal of 3.58 MHz is supplied from a 3.58 MHz oscillator 19. The phase comparator 18 also receives a burst gate pulse from a burst gate pulse generator 21 obtained by delaying and shaping the sync signal separated by a sync separator 20 from the Y signal supplied to the input terminal 12. An output signal from the phase comparator 18 is supplied to a sample and hold circuit 22 to be held for a 1-H period. The delayed signal from the sample and hold circuit 22 is supplied to a low-pass filter 23, an output signal from which is supplied to the VCO 14 for controlling its oscillation frequency. Although the arrangement of the circuit shown in FIG. 3 remains the same as that shown in FIG. 1 up to this point, it further has the circuits to be described hereinafter.

An output signal from the band-pass filter 15 is supplied to a switch 53 through a 45° phase shifter 51 and a direct coupling line 52. The switch 53 has a stationary contact x1 connected to the phase shifter 51, a stationary contact x2 connected to the direct coupling line 52, and a movable contact x3 connected to an output line 54. The switch 53 operates in accordance with the burst gate pulse from the burst gate pulse generator 21 in the following manner. The contact x3 is closed to the side of the contact x1 in the burst period, while it is closed to the side of the contact x2 in other periods. The burst signal is switched between +45° and −45° for each 1-H period with reference to the B-Y axis. The output line 54 of the switch 53 is connected to a first modulator 55 and to a first signal generator 56. The first signal generator 56 generates a first continuous wave of the same frequency fN as the carrier frequency (3.58 MHz) of the output signal from the band-pass filter 15. The first signal generator 56 comprises an APC circuit consisting of a burst gate circuit 57, a phase comparator 58, a low-pass filter 59, and a VCO 60. Of the output signal from the switch 53, the signal during the 1-burst period is supplied as a first input to the phase comparator 58. An output signal from the phase comparator 58 is supplied as a control voltage to the VCO 60 through the low-pass filter 59. An output signal from the VCO 60 is supplied as a second input to the phase comparator 58. Thus, an output signal of the same frequency (3.58 MHz) as that of the burst is produced from the VCO 60.

The output signal from the first signal generator 56 is supplied as a first input to a second modulator 61. An output signal from a second signal generator 62 is supplied as a second input to the second modulator 61. The second signal generator 62 generates a second continuous wave of the same frequency fP as the subcarrier frequency (4.43 MHz) in accordance with the PAL system.

The second modulator 61 multiplies the first and second continuous waves of frequencies fN and fP, respectively, to obtain spectra (fP−fN) and (fP+fN). These outputs from the second modulator 61 are respectively supplied to first and second filters 63 and 64 having band-pass characteristics of (fP−fN) and (fP+fN), respectively, for frequency separation. Output signals from the first and second filters 63 and 64 are respectively supplied to stationary contacts z1 and z2 of a line changeover switch 65. A movable contact z3 of the switch 65 is connected to the first modulator 55 and is alternately connected between the stationary contacts z1 and z2 for each successive line. The line changeover switch 65 receives a switch control signal having a frequency ½·fH for this switching which is supplied from an oscillator 66 connected to the sync separator 20. The oscillator 66 may comprise a flip-flop which is driven by the horizontal sync signal. The oscillation output of 3.58 MHz may be directly utilized as the first continuous wave fN to be supplied to the second modulator 61.

An output from the first modulator 55 is supplied to a mixer 16 through a band-pass filter 67 having a band-pass characteristic of fP. A PAL color TV signal is then produced from an output terminal 68.

The mode of operation of the signal converter circuit for a color TV of this embodiment of the present invention will now be described with reference to FIGS. 4 and 5. FIG. 5A shows the output signal waveform of the switch 53, FIG. 5B shows the output signal waveform of the sync separator 20, FIG. 5C shows the output signal waveform of the burst gate pulse generator 21, and FIG. 5D shows the output signal waveform of the oscillator 66. The output signals having these waveforms appear at points a to d, respectively, shown in FIG. 3.

The PAL signal shown in FIGS. 4A and 4B and the NTSC signal shown in FIG. 4C each consist of the Y signal and two chroma signals according to which the subcarrier is quadrature-modulated, as has been described earlier. The NTSC chroma signals obtained at the output end of the band-pass filter 15 are given as equation (1) below:

$$EN = (ER-EY)\cos\omega Nt + (EB-EY)\sin\omega Nt \quad (1)$$

(for $\omega N = 2\pi fN$)

Meanwhile, the PAL chroma signals must be alternately given by equations (2) and (3) for each successive line:

$$EP = (ER-EY)\cos\omega Pt + (EB-EY)\sin\omega Pt \quad (2)$$

$$EP' = -(ER-EY)\cos\omega Pt + (EB-EY)\sin\omega Pt \quad (3)$$

(for $\omega P = 2\pi fP$)

The burst signal BU of the PAL system is inclined by 45° with respect to the B-Y axis as shown in FIG. 4. This means that the burst signal of the NTSC system is extracted and is lagged by 45° before conversion of the NTSC signal to the PAL signal.

The mode of operation of the circuit of the present invention will now be described in more detail. The carrier chrominance signal Ch reproduced from the disc and supplied to the input terminal 11 has a low-frequency of 1.53 MHz. Therefore, this signal is multiplied with the CW signal of 5.11 MHz from the VCO 14 by the frequency converter 13 so as to be frequency-converted to 3.58 MHz. A carrier chrominance signal of 3.58 MHz is obtained through the band-pass filter 15.

The output signal from the band-pass filter 15 is supplied to the switch 53 through the 45° phase shifter 51 and the direct coupling line 52. The switch 53 is switched in accordance with the burst gate pulse (FIG. 5C); the movable contact x3 is connected to the side of the stationary contact x1 in the burst period and is connected to the side of the stationary contact x2 in other periods. Thus, a carrier chrominance signal as shown by the vector diagram shown in FIG. 4A is obtained from the switch 53, in which the burst signal alone is lagged by 45°.

The second modulator 61 receives the first and second continuous wave. signals having the frequencies fN (=3.58 MHz) and fP (4.43 MHz) from the first and second signal generators 56 and 62. The second modulator 61 multiplies these signals to provide a signal expressed by equation (4) below:

$$\sin\omega Pt \times \sin\omega Nt = \tfrac{1}{2}\{\cos(\omega P - \omega N)t - \cos(\omega P + \omega N)t\} \quad (4)$$
(for $\omega P = 2\pi fP$ and $\omega N = 2\pi fN$)

The output signal from the second modulator 61 as given by equation (4) above is frequency-separated through the first and second filters 63 and 64 which respectively provide continuous wave signals having frequencies of (fP−fN) and (fP+fN), respectively. This is because the filter 63 has a band-pass characteristic of 0.85 MHz (4.43−3.58), while the filter 64 has that of 8.01 MHz (4.43+3.58).

The output signals from the first and second filters 63 and 64 are alternately supplied to the first modulator 55 by the line changeover switch 65. The switch 65 is switched by the ½ fH pulse shown in FIG. 5D; the movable contact z3 is connected to the side of the stationary contact z1 for a given line and is connected to the side of the stationary contact z2 for the next line.

The function of the first modulator 55 will now be described. In addition to the signal supplied from the switch 65, the first modulator 55 receives the NTSC signal from the switch 53 in which the burst signal is lagged by 45°. Both these signals are multiplied by the first modulator 55, and the output signals as given by equations (5) and (6) below are alternately obtained for each successive line:

$$\begin{aligned}
Eo1 &= \{(ER - EY)\cos\omega Nt + (EB - EY)\sin\omega Nt\} \times \\
     &\quad (\tfrac{1}{2})\cos(\omega P - \omega N)t \\
    &= \tfrac{1}{4}\{(ER - EY)\cos(2\omega N - \omega P)t + \\
     &\quad (EB - EY)\sin(2\omega N - \omega P)t\} + \\
    &\quad \tfrac{1}{4}\{(ER - EY)\cos\omega Pt + (EB - EY)\sin\omega Pt\}
\end{aligned} \quad (5)$$

$$\begin{aligned}
Eo2 &= \{(ER - EY)\cos\omega Nt + (EB - EY)\sin\omega Nt\} \times \\
     &\quad (-\tfrac{1}{2})\cos(\omega P + \omega N)t \\
    &= \tfrac{1}{4}\{-(ER - EY)\cos(2\omega N + \omega P)t - \\
     &\quad (EB - EY)\sin(2\omega N + P)t\} + \\
    &\quad \tfrac{1}{4}\{(ER - EY)\cos(-\omega P)t - \\
     &\quad (EB - EY)\sin(-\omega P)t\}
\end{aligned} \quad (6)$$

The output signal Eo1 or Eo2 from the first modulator is supplied to the band-pass filter 67 which extracts the fP frequency component to provide outputs as given by the equations (7) and (8) below:

$$Eo1' = \tfrac{1}{4}\{(ER-EY)\cos\omega Pt + (EB-EY)\sin\omega Pt\} \quad (7)$$

$$Eo2' = \tfrac{1}{4}\{-(ER-EY)\cos\omega Pt + (EB-EY)\sin\omega Pt\} \quad (8)$$

Equations (7) and (8) are respectively equivalent to equations (2) and (3) given above which provide the PAL signal.

Although the signal given by equations (7) and (8) has a level ¼ that given by equations (2) and (3), this may be corrected by level adjustment.

In this manner, an NTSC signal is converted into a PAL signal which is synthesized with the Y signal by the mixer 16. The output signal from the output terminal 68 may then be reproduced by a PAL receiver.

The connections of parts of the circuit shown in FIG. 3 will now be described with reference to FIGS. 6 to 8.

FIG. 6 shows the configuration of the 45° phase shifter 51. The 45° phase shifter 51 comprises a transistor Q1 and a low-pass filter consisting of a resistor R1 and a capacitor C1. The base of the transistor Q1 is connected to the low-pass filter described above, the collector thereof is connected to a voltage source VC, and the emitter thereof is grounded through a resistor R2. The emitter of the transistor Q1 is also connected to the stationary contact x1 of the switch 53. The phase of the input signal is shifted by 45°, which will introduce a gain attenuation of about 3 dB. In consideration of this, the gain of the original signal on the direct coupling line 52 is also attenuated by an attenuator consisting of resistors R3 and R4, and the attenuated signal is supplied to the base of a transistor Q2. The emitter of the transistor Q2 is connected to the stationary contact X2 of the switch 53 and is also grounded through a resistor R5. The collector of the transistor Q2 is connected to the voltage source VC. The resistor R4 is grounded through a DC cutoff capacitor C2.

Figure 7:
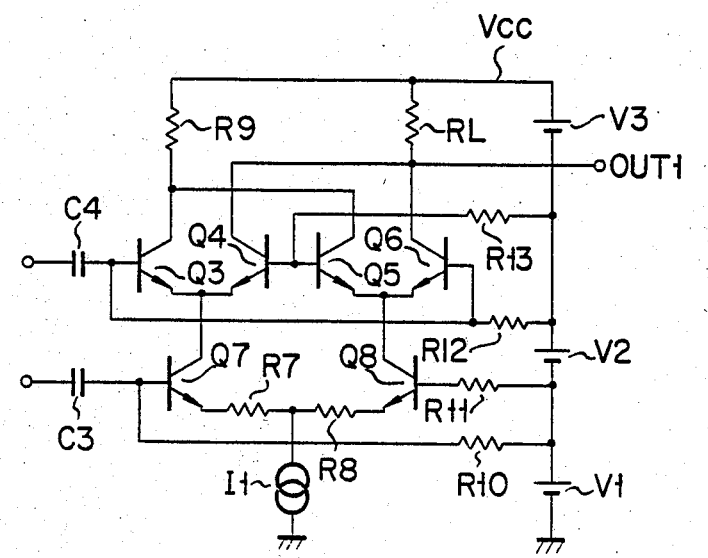

FIG. 7 shows the configuration of the first or second modulator 55 or 61. The modulator is of the double balanced modulator type and has transistors Q3 and Q4 constituting a first differential amplifier, transistors Q5 and Q6 constituting a second differential amplifier, constant current source transistors Q7 and Q8 for the first and second differential amplifiers, and a constant current source circuit I1 for these transistors Q7 and Q8.

The emitters of the transistors Q7 and Q8 are connected to the constant current source circuit I1 through resistors R7 and R8, respectively. The collectors of the transistors Q3 and Q5 are coupled to each other and are connected to a voltage supply line Vcc through a resistor R9. The collectors of the transistors Q4 and Q6 are coupled to each other and are connected to the voltage supply line Vcc through a resistor RL as a load. Bias sources V1, V2 and V3 are interposed between the voltage supply line Vcc and ground. The voltage from the bias source V1 is supplied to the bases of the transistors Q7 and Q8 through resistors R10 and R11, respectively. The voltage from the bias source V2 is supplied to the bases of the transistors Q3 and Q6 through a resistor R12 and to the bases of the transistors Q4 and Q5 through a resistor R13.

First and second signals are supplied through capacitors C3 and C4, and an output modulated signal is obtained from an output terminal OUT1 connected to the collectors of the transistors Q4 and Q6.

Figure 8:
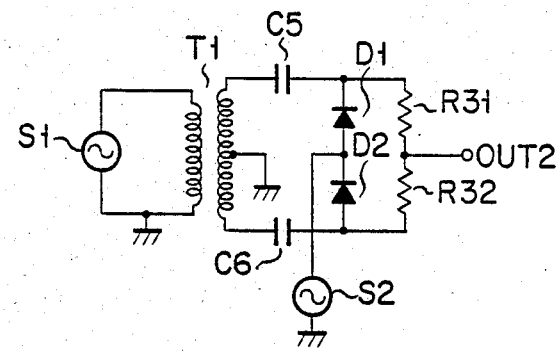

FIG. 8 shows the configuration of the first modulator 55 or the second modulator 61, which use passive elements. A first signal source S1 is connected to the primary winding of a transformer T1. The middle point of the secondary winding of the transformer T1 is grounded, one end thereof is connected to an output terminal OUT2 through a capacitor C5 and a resistor R31, and the other end thereof is connected to the output terminal OUT2 through a capacitor C6 and a resistor R32. The cathode of a diode D1 is connected to a node of the capacitor C5 and the resistor R31, while the anode of a diode D2 is connected to a node of the capacitor C6 and the resistor R32. A second signal source S2 is connected to the anode of the diode D1 and to the cathode of the diode D2.

The configuration of the first signal generator 56 is not limited to that shown in FIG. 3. For example, the output signal from the burst gate circuit 57 may be supplied through a filter with high Q output level, for example, a filter using a crystal, to be upper-limited and to be shaped.

A signal converter circuit for a color TV according to another embodiment of the present invention will now be described with reference to FIG. 9. The same reference numerals as in FIG. 3 denote the same parts in FIG. 9, and a detailed description thereof will be omitted.

Figure 9:
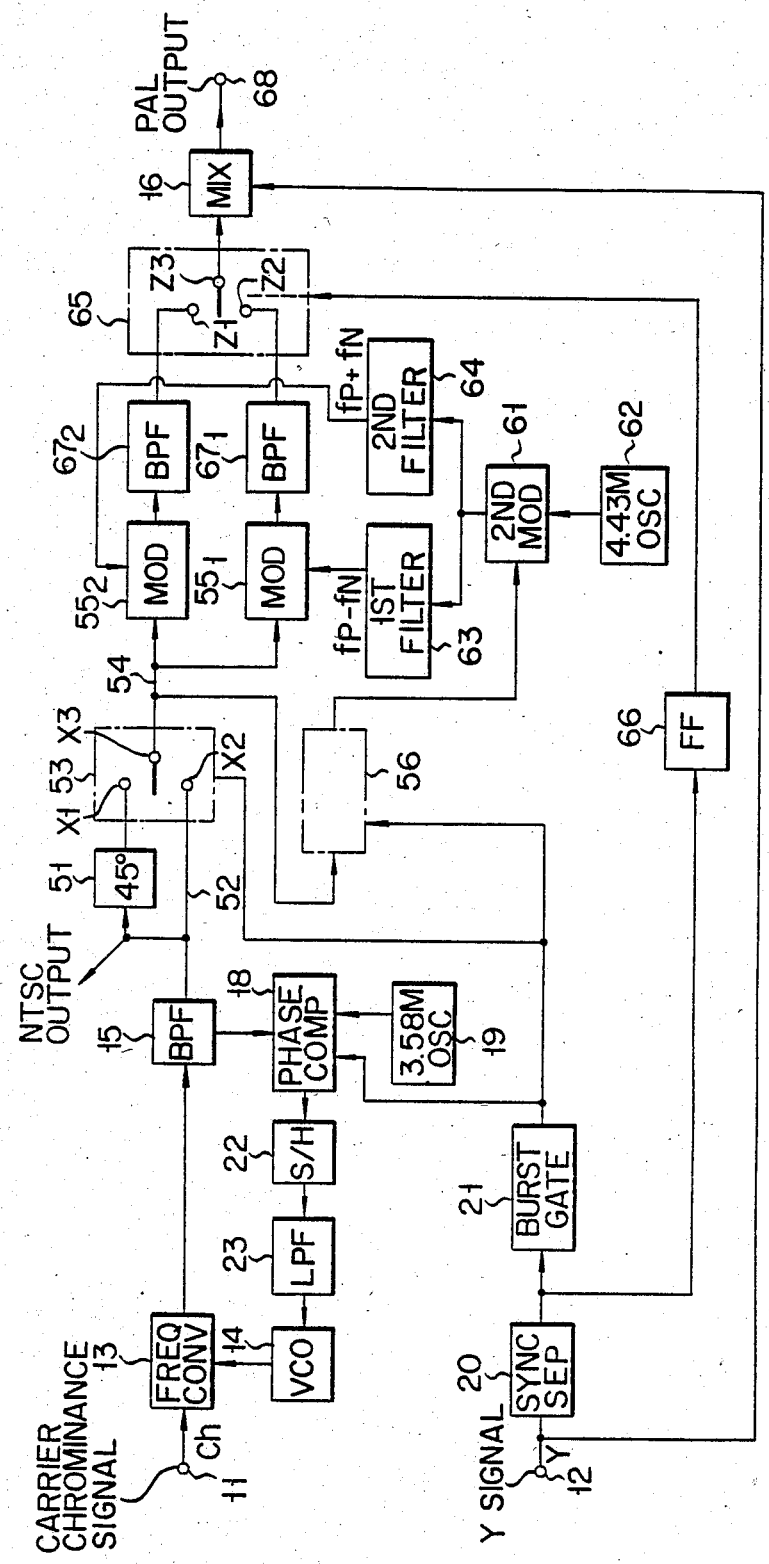
FIG. 9 is a block diagram showing a signal converter circuit for a color TV according to another embodiment of the present invention.

Referring to FIG. 9, the modulator 55 and the bandpass filter 67 shown in FIG. 3 are modified, and the position of a line changeover switch 65 is changed. An output signal from a switch 53 and an output signal from a first filter 63 of (fP−fN) band-pass characteristic are supplied to a first modulator $55_1$. Similarly, the output signal from the switch 53 and an output signal from a second filter of (fP+fN) band-pass characteristic are supplied to a first modulator $55_2$. Output signals from the first modulators $55_1$ and $55_2$ are respectively supplied to band-pass filters $67_1$ and $67_2$ for extracting the fP frequency component. Output signals from the band-pass filters $67_1$ and $67_2$ are respectively supplied to stationary contacts z1 and z2 of the line changeover switch 65. A movable contact z3 of the line changeover switch 65 is connected to a mixer 16.

With the arrangement shown in FIG. 9, the signal as given by equation (5) above is obtained as the output signal from the modulator $55_1$. The signal as given by equation (7) is obtained as the output signal from the band-pass filter $67_1$.

Meanwhile, the signal as given by equation (6) is obtained as the output signal from the modulator $55_2$, and the signal as given by equation (8) is obtained as the output signal from the band-pass filter $67_2$. The output signals from the band-pass filters $67_1$ and $67_2$ are alternately switched for each successive line by the line changeover switch 65, that is, are converted to the PAL signal which is supplied to the mixer 16.

Figure 11:
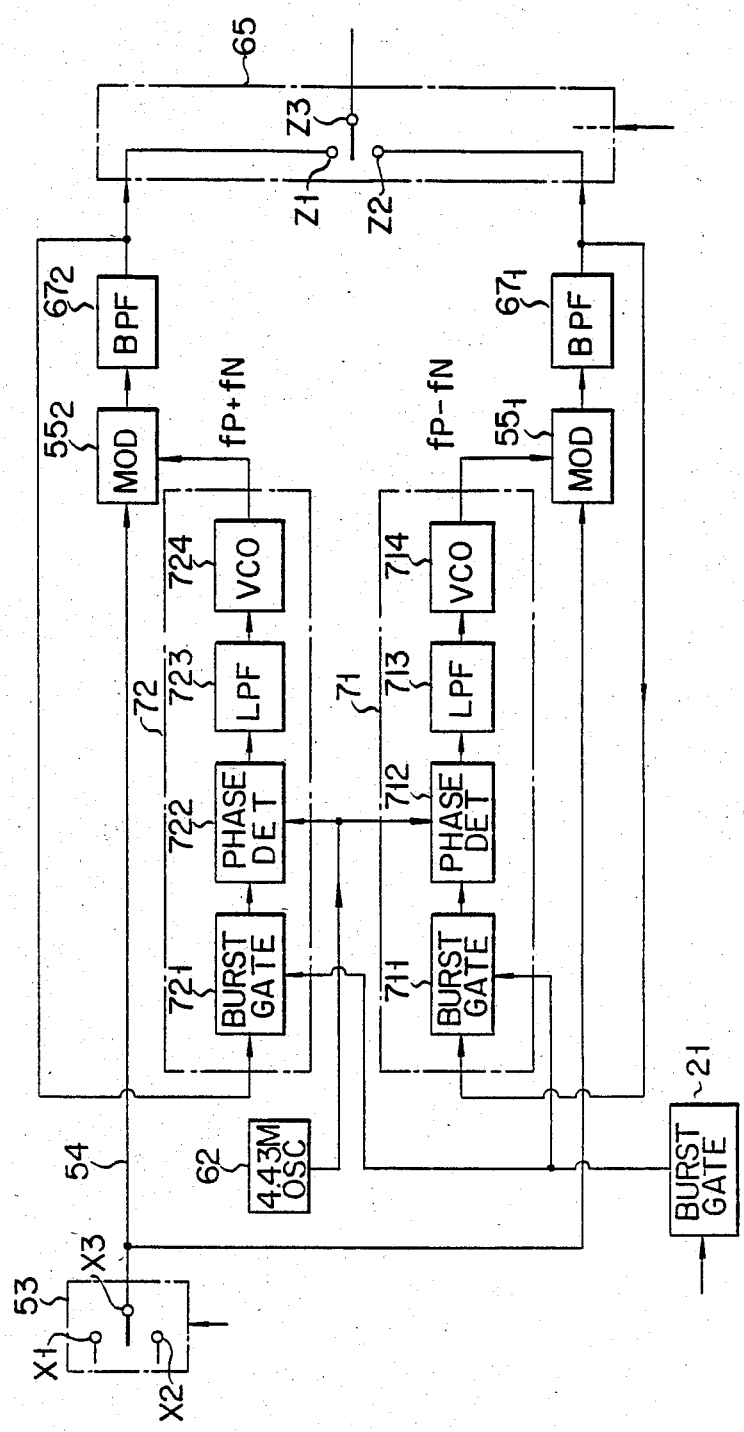
FIG. 11 is a block diagram showing an example of a part of the circuit shown in FIG. 10.

FIGS. 10 and 11 show a signal converter for a color TV according to still another embodiment of the present invention. The same reference numerals as in FIG. 9 denote the same parts in FIG. 10. The signal converter of this embodiment has continuous wave generators 71 and 72 for generating continuous waves of frequencies (fP−fN) and (fP+fN), respectively, which replace the modulator 61 and the filters 63 and 64 shown in FIGS. 3 or 9. The continuous wave generator 71 or 72 receives a burst gate pulse from a burst gate pulse generator 21 and also receives a signal of 4.43 MHz from a signal generator 62 for generating a continuous wave of frequency fP. Output signals from the continuous wave generators 71 and 72 are supplied to first modulators $55_1$ and $55_2$ of the same configuration as those described with reference to FIG. 9.

FIG. 11 shows the configuration of the continuous wave generator 71 or 72 shown in FIG. 10. A description will first be made with reference to the continuous wave generator 71. The continuous wave generator 71 comprises an APC circuit. A carrier chrominance signal from a band-pass filter $67_1$ as described with reference to FIG. 9 is supplied to a burst gate circuit 711 of the continuous wave generator 71 only for the burst period. The burst from the burst gate circuit 711 is supplied to the first input end of a phase detector 712. The continuous wave of frequency fP from a signal generator 62 is supplied to the second input end of the phase detector 712. An output signal from the phase detector 712 is supplied to a VCO 714 through a low-pass filter 713. The VCO 714 produces a continuous wave of frequency (fP−fN), which has the same phase as that from the signal generator 62.

The continuous wave generator 72 has a similar configuration and comprises a burst gate circuit 721, a phase detector 722, a low-pass filter 723, and a VCO 724. The VCO 724 of the continuous wave generator 72 produces a continuous wave of frequency (fP+fN).

Referring to FIG. 10, an output signal from a switch 53 is an NTSC chroma signal which has the carrier frequency fN, and which is given by equation (1) above. Since the output signal from the continuous wave generator 71 is given by:

$$\cos(\omega P - \omega N)t \qquad (9)$$

the output signal from the modulator $55_1$ may be given by equation (10) below:

$$\begin{aligned} eo1 &= \{(ER - EY)\cos\omega Nt + (EB - EY)\sin\omega Nt\} \times \\ &\quad \cos(\omega P - \omega N)t \\ &= (\tfrac{1}{2})\{(ER - EY)\cos(2\omega N - \omega P)t + \\ &\quad (EB - EY)\sin(2\omega N - \omega P)t\} + \\ &\quad (\tfrac{1}{2})\{(ER - EY)\cos\omega Pt + (EB - EY)\sin\omega Pt\} \end{aligned} \qquad (10)$$

Similarly, since the output signal from the continuous wave generator 72 is given by:

$$-\cos(\omega P + \omega N)t \qquad (11)$$

the output signal from the modulator $55_2$ is given by equation (12) below:

$$\begin{aligned} eo2 &= \{(ER - EY)\cos\omega Nt + (EB - EY)\sin\omega Nt\} \times \\ &\quad -\cos(\omega P + \omega N)t \\ &= (\tfrac{1}{2})\{-(ER - EY)\cos(2\omega N + \omega P)t - \end{aligned} \qquad (12)$$

-continued $$(EB - EY)\sin(2\omega N + \omega P)t\} +$$
$$(\tfrac{1}{2})\{-(ER - EY)\cos(-\omega P)t -$$
$$(EB - EY)\sin(-\omega P)t\}$$

Since the fP frequency component is extracted from these output signals by band-pass filters $67_1$ and $67_2$, the output signal from the band-pass filter $67_1$ is given as:

$$eo1' = (\tfrac{1}{2})\{(ER-EY)\cos\omega Pt + (EB-EY)\sin\omega Pt\} \quad (13)$$

while the output signal from the band-pass filter $67_2$ is given as:

$$eo2' = (\tfrac{1}{2})\{-(ER-EY)\cos\omega Pt + (EB-EY)\sin\omega Pt\} \quad (14)$$

The output signals as given by equations (13) and (14) above are alternately switched for each successive line by a line changeover switch 65 and are thus converted to a PAL signal. Although the signals given by equations (13) and (14) have a level half that of those given by equations (2) and (3), this may be corrected by level adjustment. The PAL signal thus obtained is synthesized with the Y signal by a mixer 16.

A description has been given for a case wherein a color TV signal of the NTSC system is converted into a color TV signal of the PAL system. However, the present invention may be similarly applied for converting a PAL color TV signal into an NTSC color TV signal. In this case, in the embodiment shown in FIG. 3, the continuous wave signals of frequencies (fN−fP) and (fN+fP) are alternately supplied to one input end of the modulator 55. When the signal supplied to the other input end of the modulator 55 has the waveform as shown in FIG. 4(a), modulation is performed by the continuous wave of frequency (fN−fP). On the other hand, when the signal supplied to the other input end of the modulator 55 has the waveform as shown in FIG. 4(b), modulation may be performed by the continuous wave of frequency (fN+fP). For the purpose of phase adjustment of the burst signal, the configuration of the phase shifter 51 and the switch 53 shown in FIG. 3 may be modified and a circuit for shifting the phase of the burst signal may be interposed between the band-pass filter 67 and the mixer 16.

In the embodiment shown in FIGS. 9 and 10, in order to perform PAL to NTSC conversion, the continuous wave signal of frequency (fN−fP) may be supplied to the modulator $55_1$, while the continuous wave signal of frequency (fN+fP) may be supplied to the modulator $55_2$.

In addition, the band-pass filter 67 of FIG. 3 and the band-pass filters $67_1$ and $67_2$ may be replaced by filters having a band-pass characteristic of fN.

Various other changes and modifications may be made within the spirit and scope of the present invention.

When a signal converter for a color TV of the present invention is applied to a video disc player, an NTSC signal may be readily converted to a PAL signal. Alternatively, a PAL signal may be readily converted to an NTSC signal.

The circuit of the present invention may be simple unlike a conventional circuit which must perform complete demodulation of an NTSC signal and subsequent conversion to a PAL signal.

What we claim is:

1. A signal converter for a color TV for converting a signal of the NTSC system, in which a subcarrier is quadrature-modulated by two chroma signal components, to a signal of the PAL system, in which a subcarrier is quadrature-modulated by two chroma signal components one of which two chroma signal components is inverted for each successive line, or vice versa, comprising:

a signal input terminal which receives an original signal having chroma signal components which are quadrature-modulated on a subcarrier having a frequency f1;

a signal output terminal for producing a converted signal having chroma signal components which are quadrature-modulated on a subcarrier having a frequency f2 (where f1≠f2);

first signal generating means for generating a first continuous wave signal having a frequency equal to a difference between the frequencies f1 and f2;

second signal generating means for generating a second continuous wave signal having a frequency equal to a sum of the frequencies f1 and f2;

modulating means for producing a first modulated signal by multiplying a signal corresponding to the original signal received by said signal input terminal by the first continuous wave signal and for producing a second modulated signal by multiplying the signal corresponding to said original signal by the second continuous wave signal;

line changeover switch means for alternately switching between the first and second modulated signals from said modulating means for each successive line, and for supplying a selected signal to a signal transmission line coupled to said signal output terminal;

filter means interposed between said signal output terminal and said modulating means, for extracting the chroma signal components to be produced from said signal output terminal from the first and second modulated signals;

phase shift means coupled to said signal input terminal, for shifting the phase of a specific signal corresponding to said original signal and providing a phase shifted signal; and signal select means coupled to said phase shift means and to said modulating means and being responsive to a burst gate signal derived from the signal of said NTSC system, for selecting either one of said specific signal and phase shifted signal in a manner that said specific signal is selected during a period except for the duration period of said burst gate signal, the selected signal from said signal select means being used as the signal multiplied by said modulating means.

2. The circuit of claim 1, wherein said modulating means receives as one input said original signal and as the other input said first continuous wave signal and said second continuous wave signal; and said line changeover switch is interposed between said modulating means and said first and second signal generating means so that the first and second continuous wave signals may be alternately supplied to said modulating means for each successive line.

3. The circuit of claim 2, wherein said first and second signal generating means comprise a first continuous wave signal generator of a frequency fN, a second continuous wave signal generator of a frequency fP, a third modulator for multiplying continuous wave signals from said first and second continuous wave signal generators, and first and second filters for frequency-separating an output signal from said third modulator so as to obtain the continuous wave signals of frequencies equal to the difference and sum, respectively, of the frequencies fN and fP.

4. The circuit of claim 2, wherein the original signal received by said signal input terminal is delayed through a phase shifter when the signal prior to conversion is a signal according to the NTSC system.

5. The circuit of claim 1, wherein said first and second signal generating means comprise a first continuous wave signal generator of a frequency fN, a second continuous wave signal generator of a frequency fP, a third modulator for multiplying continuous wave signals from said first and second continuous wave signal generators, and first and second filters for frequency-separating an output signal from said third modulator so as to obtain the continuous wave signals of frequencies equal to the difference and sum, respectively, of the frequencies fN and fP.

6. The circuit of claim 4, wherein the original signal received by said signal input terminal is delayed through a phase shifter when the signal prior to conversion is a signal according to the NTSC system.

7. The circuit of claim 1, wherein the original signal received by said signal input terminal is delayed through a phase shifter when the signal prior to conversion is a signal according to the NTSC system.

8. A signal converter for a color TV for converting a signal of the NTSC system, in which a subcarrier is quadrature-modulated by two chroma signal components, to a signal of the PAL system, in which a subcarrier is quadrature-modulated by two chroma signal components one of which two chroma signal components is inverted for each successive line, or vice versa, comprising:
a signal input terminal which receives an original signal having chroma signal components which are quadrature-modulated on a subcarrier having a frequency f1;
a signal output terminal for producing a converted signal having chroma signal components which are quadrature-modulated on a subcarrier having a frequency f2 (where f1≠f2);
first signal generating means for generating a first continuous wave signal having a frequency equal to a difference between the frequencies f1 and f2;
second signal generating means for generating a second continuous wave signal having a frequency equal to a sum of the frequencies f1 and f2;
modulating means for producing a first modulated signal by multiplying a signal corresponding to the original signal received by said signal input terminal by the first continuous wave signal and for producing a second modulated signal by multiplying the signal corresponding to said original signal by the second continuous wave signal, said modulating means including a first modulator for receiving said original signal and said first continuous wave signal, and a second modulator for receiving said original signal and said second continuous wave signal;
line changeover switch means for alternately switching between the first and second modulated signals from said modulating means for each successive line, and for supplying a selected signal to a signal transmission line coupled to said signal output terminal, said line changeover means being arranged on said signal transmission line at the side of output ends of said first and second modulators so that output signals from said first and second modulators are alternately supplied to said signal output terminal for each successive line; and
filter means interposed between said signal output terminal and said modulating means, for extracting the chroma signal components to be produced from said signal output terminal from the first and second modulated signals.

9. The circuit of claim 8, wherein said first and second signal generating means comprise a first continuous wave signal generator of a frequency fN, a second continuous wave signal generator of a frequency fP, a third modulator for multiplying continuous wave signals from said first and second continuous wave signal generators, and first and second filters for frequency-separating an output signal from said third modulator so as to obtain the continuous wave signals of frequencies equal to the difference and sum, respectively, of the frequencies fN and fP.

10. The circuit of claim 8, wherein the original signal received by said signal input terminal is delayed through a phase shifter when the signal prior to conversion is a signal according to the NTSC system.

* * * * *

UNITED STATES PATENT AND TRADEMARK OFFICE
CERTIFICATE OF CORRECTION

PATENT NO. : 4,568,963

DATED : Feb. 4, 1986

INVENTOR(S) : Tetsuro SAKAI, Kazuhiko HONDA

It is certified that error appears in the above-identified patent and that said Letters Patent is hereby corrected as shown below:

ON THE TITLE PAGE:

Change "[30]  Foreign Application Priority Data

Mar. 19, 1982 [JP] Japan...............57-462694" to

--[30]  Foreign Application Priority Data

Mar. 19, 1982 [JP] Japan...............57-42694--.

Signed and Sealed this

Twenty-seventh Day of January, 1987

*Attest:*

DONALD J. QUIGG

*Attesting Officer*     *Commissioner of Patents and Trademarks*